P. B. RABE.
STORAGE BATTERY.
APPLICATION FILED APR. 30, 1919.
1,328,394. Patented Jan. 20, 1920.
2 SHEETS—SHEET 1.
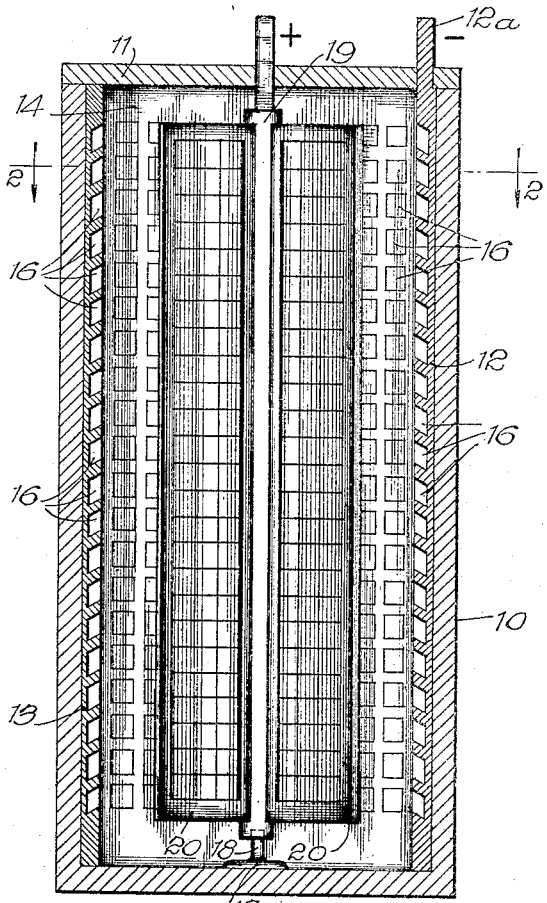
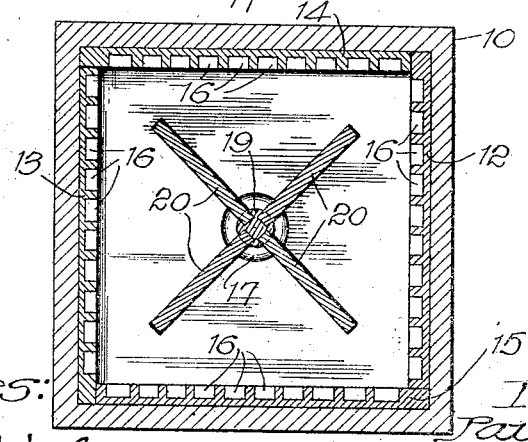

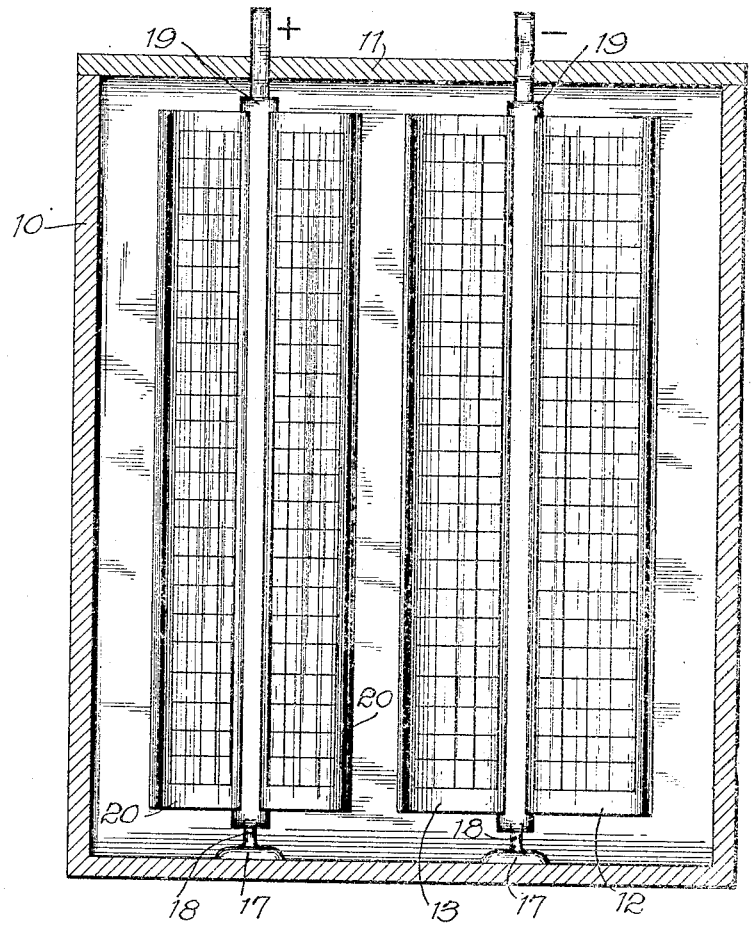

UNITED STATES PATENT OFFICE.

PAUL B. RABE, OF CHICAGO, ILLINOIS, ASSIGNOR TO O. K. GIANT BATTERY CO., OF GARY, INDIANA, A CORPORATION OF DELAWARE.

STORAGE BATTERY.

1,328,394.　　　　　Specification of Letters Patent.　　Patented Jan. 20, 1920.

Application filed April 30, 1919. Serial No. 293,606.

*To all whom it may concern:*

Be it known that I, PAUL B. RABE, a citizen of the United States, residing at Chicago, in the county of Cook and State of Illinois, have invented a certain new and useful Improvement in Storage Batteries, (Case 4,) of which the following is a full, clear, concise, and exact description, reference being had to the accompanying drawings, forming a part of this specification.

My invention relates to storage batteries, and broadly stated, is concerned with certain improvements in the means for and manner of mounting and supporting the grids within a storage battery cell. In the arrangement hereinafter described and subsequently claimed, the several grids are so disposed and carried within the storage battery cell that it is possible to dispense with the spacers which are ordinarily interposed between grids of opposite polarity. My improved storage battery cell is furthermore characterized by its compactness.

As a description of my invention will be best understood when read in connection with the drawings illustrating the same, I shall proceed with a description of the accompanying drawings, in which—

Figure 1 is an axial sectional view of a storage battery cell embodying the improvements of my invention;

Fig. 2 is a horizontal sectional view taken on the line 2—2 of Fig. 1; and

Fig. 3 is a vertical sectional view illustrating a modified form of storage battery cell embodying certain improvements of my invention.

Similar characters of reference refer to similar parts throughout the several views.

In Figs. 1 and 2 the receptacle constituting the cell container is illustrated at 10, and at 11 is illustrated a suitable closure therefor. The details of the receptacle are unimportant, save that it is desirable that it be generally square or rectangular in form in order that the grid-plate liners may be conveniently mounted therein as presently described.

At 12, 13, 14, and 15 I have illustrated four grid plates which are disposed against the inner surfaces of the side walls of the receptacle 10, and thus in effect constitute a lining for the receptacle. The grid plates mentioned are similar in all respects except that plate 12 is provided with an upwardly-extending arm 12ª whereto a suitable terminal or jumper may be electrically connected in any well-known manner. The said grid plates 12, 13, 14 and 15 are formed of any suitable grid plate material which possesses sufficient mechanical strength, and will not in the presence of the other substances within the cell cause local chemical action to occur, and which furthermore has a relatively low melting point. An alloy of lead and antimony is entirely suitable for this purpose.

The outer faces of the grid plates 12, 13, 14, and 15—that is, the faces which contact with the side walls of the receptacle—are imperforate. Formed in the inner face of each of said grid plates is a plurality of cells 16, 16 adapted to receive any suitable and well-known grid paste. It will be noted that the upper and lower walls of each of the cells 16 incline downwardly from the inner face of the plate, so that there is little or no tendency for the grid paste to fall out of the cells. The cells are conveniently arranged in ranks and files and are evenly distributed over the inner surfaces of the plates.

The grid plates 12, 13, 14 and 15 are disposed within the receptacle with their lateral edges overlapping, as illustrated in Fig. 2. The edges thus overlapped and abutting are connected mechanically and electrically by fusing or "burning" the parts together, which is of course readily accomplished, as the grid plates are formed of an alloy having a comparatively low fusing point.

In so far as my invention is concerned, it is unimportant whether the grid plates just described be prepared as negative or positive plates, although I prefer that they shall constitute the negative plates. I shall now proceed to describe what will constitute the positive side of the cell.

Centrally located on the bottom of the cell receptacle, and secured thereto by screws or otherwise is a porcelain rest 17 provided with an upstanding boss 18. Having its lower end provided with a socket fitting over the boss 18 is a rod 19, the upper end of which, square in cross-section, passes through a correspondingly shaped aperture in the closure 11 and constitutes the positive terminal of the cell. This rod is provided with four elongated slots formed therein at intervals of 90 degrees, and fitting into said slots are the grid plates 20, 20, each of which extends radially from the rod 19. Both the rod 19 and the grid plates 20, 20 are formed of metal which has a relatively low fusing point, and these parts are mechanically and electrically connected together by fusing or "burning" the edges of the grids into the slots of the rod 19. Thus the rod 19 and grid plates 20, 20 constitute a unit readily insertible in and removable from the receptacle 10. The paste-receiving cell structure of the grid plates 20, 20 is not of particular importance as long as said grid plates are capable of properly carrying sufficient paste and of exposing a sufficient area thereof to the electrolyte, which, for the sake of clearness in illustration, has been omitted from the drawings. I will say, however, that the particular grid plate structure shown and described in my co-pending application, Serial No. 293,603, filed April 30th, 1919, is particularly adapted for use in this connection. It is to be understood that in practice the receptacle will be filled with any suitable liquid or non-liquid electrolyte.

It will be seen that the positive and negative grid plates are supported in such a manner that is is unnecessary to provide wood or other non-conducting spacers between the positive and negative plates, and furthermore, that either the positive or negative plates may be removed as a unit for inspection or repair without disturbing the mounting of the plates of opposite polarity. In the modified form of storage battery cell illustrated in Fig. 3, both the positive and negative removable grid plate structures are substantially similar to the negative grid plate structure shown in Figs. 1 and 2. Therefore in Fig. 3 I have applied the same reference numerals to the several parts as have been applied to corresponding parts in the arrangement of Figs. 1 and 2. The arrangement shown in Fig. 3 is particularly advantageous in that the cell is compact and in that both the positive and negative grid plate structures may be inserted and removed as units for purposes of inspection and repair.

Having thus described my invention, what I claim as new and desire to secure by Letters Patent of the United States is:

1. A storage battery cell of the class described comprising a rectangular receptacle, a plurality of grid plates, one disposed against each side wall of the cell receptacle with adjacent lateral edges of said grid plates abutting and being "burned" together to constitute a unitary grid plate liner for said receptacle, a plurality of downwardly inclined paste-receiving cells formed in the inner surface of each of said grid plates, a cover for said receptacle, a centrally disposed supporting stud carried by the bottom of said receptacle, a rod of low-fusing metal provided at its lower end with a socket fitted over said stud and having its upper end extending through said cover, a plurality of longitudinal slots in said rod, a plurality of grid plates, each having one of its lateral edges fitted in one of said longitudinal recesses and secured thereto by being "burned" to the rod, said last mentioned grid plates radiating from said rod.

2. A storage battery cell comprising in combination with a cell receptacle a unitary paste-receiving grid plate lining for the inner surfaces of the receptacle side walls, a rod of low-fusing metal vertically and centrally disposed in said receptacle, a plurality of longitudinal slots in said rod, a plurality of paste-receiving grid plates each having one of its lateral edges fitted in one of said slots and secured therein by being "burned" to said rod, said last-named plates radiating from said rod substantially as described.

3. A storage battery cell comprising in combination with a cell receptacle, grid plates of one polarity supported within said receptacle, a rod of low-fusing metal vertically disposed in said receptacle, a plurality of longitudinal slots in said rod, a plurality of vertically disposed grid plates each having one of its lateral edges fitted in one of said slots and secured therein by being "burned" to said rod, said last mentioned grid plates radiating from said rod, said last mentioned grid plates being of different polarity than the grid plates first mentioned.

4. A storage battery cell of the class described comprising in combination with a rectangular cell receptacle, a plurality of paste receiving grid plates lining the inner surfaces of the receptacle side walls, a rod of low-fusing metal vertically disposed in said receptacle, a plurality of longitudinal slots in said rod, a plurality of paste receiving grid plates each having one of its lateral edges fitted in one of said slots and secured therein by being "burned" to said rod, said last mentioned plates radiating from said rod.

5. A storage battery cell of the class described comprising in combination with a rectangular cell receptacle, paste receiving grid plates lining the inner surfaces of the receptacle side walls, a rod vertically and centrally disposed in said receptacle together with four vertically disposed paste receiving grid plates carried by said rod, each of said grid plates having one of its lateral edges attached to said rod and radiating from said rod toward one of the four corners of the receptacle.

In witness whereof, I hereunto subscribe my name this 22 day of April, 1919.

PAUL B. RABE.

Witnesses:
MARY FAE PETRIE,
EDNA V. GUSTAFSON.